UNITED STATES PATENT OFFICE 2,100,353

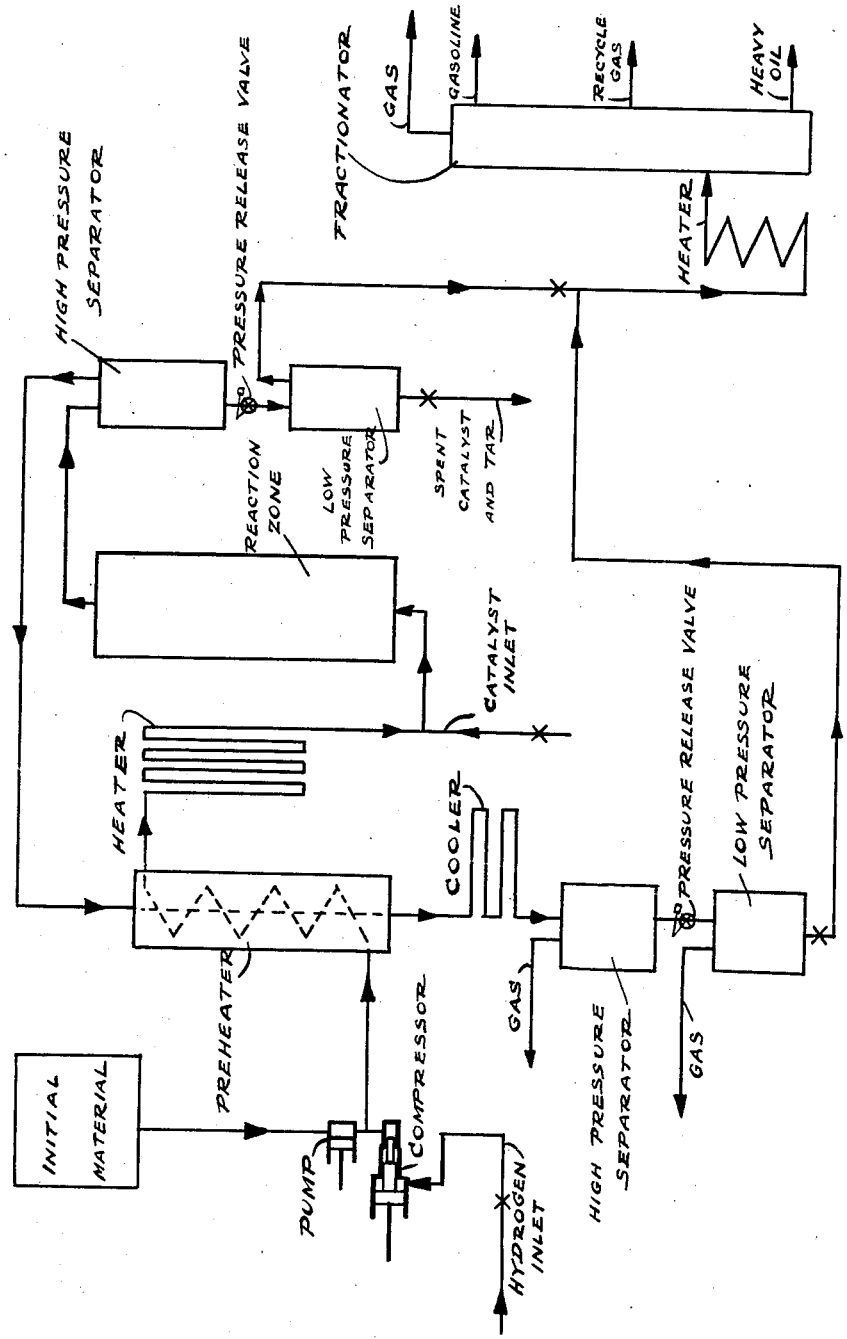

PRODUCTION OF HYDROCARBONS OF LOW BOILING POINT

Mathias Pier, Heidelberg, and Ernst Donath, Mannheim, Germany, assignors to I. G. Farbenindustrie Aktiengesellschaft, Frankfort-on-the-Main, Germany Application May 2, 1934, Serial No. 723,502
In Germany May 19, 1933

1 Claim. (Cl. 196—53)

The present invention relates to improvements in the production of hydrocarbons of low boiling point, in particular non-knocking motor fuels, from oils of high boiling point, petroleum residues, tars and the like.

We have found that in the preparation of hydrocarbons of low boiling point, in particular non-knocking motor fuels, from heavy hydrocarbons boiling at least for the most part above 325° C., such as oils of high boiling point, petroleum residues, tars or the like by splitting in the liquid phase in the presence of catalysts at temperatures above 400° C. and at pressures of more than 20 atmospheres especially good yields of valuable gasoline are obtained by continually withdrawing from the reaction chamber the catalyst, which is employed in a state of fine dispersion and in a small amount, together with the products formed, and returning all or a part of the products having a boiling point above the upper boiling range of gasoline to the reaction chamber after having them freed from polymerized substances of high molecular weight for example of more than 300, especially asphaltic substances, as well as from catalyst. The removal of the said polymerized substances and of catalytic material may be effected in any suitable manner, as for example by precipitating them with flocculating agents as for example hydrocarbons rich in hydrogen, or by distillation from these substances.

It is advantageous to add in the splitting step small amounts of gases or vapors, especially hydrogen or gases containing hydrogen. When adding hydrogen, its amount should be so regulated that there are less than 100 liters of hydrogen for each kilogram of normally liquid product leaving the reaction chamber.

Working in this manner has the great advantage that from oils of high boiling point, residues and the like, good yields of valuable gasoline little inclined to knocking are obtained in one stage while avoiding waste by reason of polymerization. In the usual splitting of initial materials of high boiling point for the purpose of obtaining non-knocking gasoline poor in hydrogen, generally speaking a considerable formation of polymerization products takes place which in turn leads to further polymerization and coking. This disadvantage is avoided according to this invention by continually withdrawing the added finely divided catalyst with the reaction product and separating any polymerization products formed with the catalyst; fresh catalyst is thus supplied to the reaction chamber over again. In consequence of the increased activity of the catalyst, it is sufficient to employ it in very small amounts. Side reactions such as the formation of coke and gas, are to a large extent avoided according to this invention for the reasons hereinbefore given.

In order to carry out the process, heavy oils which boil mainly above 325° C. and which are obtained by distillation, cracking or destructive hydrogenation of tars, mineral oils, coals and the like, may be employed as initial materials.

As catalysts may be mentioned substances promoting the splitting of hydrocarbons as for example metals or metal compounds, such as oxides, sulphides, phosphates and halides. It is advantageous to select compounds of metals of the 4th to the 8th groups of the periodic system. The catalysts may be applied unto carriers, as for example active carbon, active silica, bauxite, Florida earth or lignite coke. It is preferable to employ small amounts of catalyst, preferably less than 3 per cent, as for example from 0.1 to 2 per cent with reference to the initial materials to be converted. The catalyst is added to the initial material in a finely ground condition (for example in a condition enabling about 90 per cent to pass through a sieve having 10,000 meshes per square centimeter) before, during or after heating it to the reaction temperature; especially in the latter case it may be supplied directly into the reaction chamber. The catalyst is continually led through the reaction chamber with the initial material; consequently the polymerized constituents of high molecular weight which are present or formed are removed with the catalyst so that there is always present in the reaction chamber a catalyst of strong activity. When working in the presence of small amounts of hydrogen, the latter is usually mixed with the initial material before the heating. It may be preferable in some cases, however, to add the hydrogen wholly or partly in the preheating or the reaction chamber. In the latter case, on the one hand, a too far-reaching hydrogenation of the initial materials during the preheating at low temperatures is avoided while, on the other hand, an undesirable formation of strongly unsaturated or polymerized products at the higher temperatures in the reaction vessel is counteracted.

The temperature employed for splitting treatment range from 400° to 600° C., advantageously between 430° and 520° C., while pressures of more than 20 atmospheres, preferably more than 40 atmospheres, as for example at 50, 100, 200, 500 or 1000 atmospheres are employed. The pressure depends on the molecular weight and hydrogen content of the initial material. Thus for example when working in the presence of hydrogen, the pressure should be higher the more rich in asphalt, i. e. the poorer in hydrogen, the initial material. In the case of material rich in asphalt and poor in hydrogen, especially when working with asphalt-base oils of high molecular weight, a working pressure of above 70 atmospheres is suitable.

It may be preferable in the case of initial materials especially poor in hydrogen and rich in asphalt to remove therefrom the asphaltic constituents partly or wholly by known means, as for example by treatment with solvents, such as liquefied hydrocarbons which are gaseous at ordinary temperature, or aniline, alcohol, ketones or phenols, or by treatment with adsorption agents such as bleaching earth or bauxite, or by distillation, if desired in the presence of adsorption agents, or by washing with sulphuric acid or by a combination of these means, as for example distillation with subsequent acid treatment. The gas oils formed by the reaction and fractions of higher boiling point are freed from catalytic matter and from asphalt and/or other polymerization products and returned to the cracking chamber. They may, however, be employed in part in other ways, as for example as Diesel oil, or may be in part converted into gasoline by catalytic destructive hydrogenation.

An apparatus suitable for carrying out the process of the present invention is illustrated diagrammatically in the accompanying drawing in which the single figure is a front elevation. The flow of reaction material thru this apparatus is indicated by appropriate descriptive legends.

The following examples will further illustrate the nature of this invention but the invention is not restricted to these examples.

Example 1

A distillation residue of a mixed-base petroleum having a specific gravity of 0.940 and containing 12 per cent of constituents boiling up to 325° C. is heated with hydrogen under a pressure of 70 atmospheres to 450° C. in a tubular preheater; then 1 per cent of a catalyst consisting of a mixture of wood charcoal with 10 per cent of iron sulphide is added and the whole is led through the reaction chamber, the time during which it is present therein amounting to about 25 minutes. The amount of hydrogen is such that there are 50 liters of hydrogen for each kilogram of normally liquid products obtained in all. The products leaving the reaction chamber are led into a hot separator in which the separation of vapors from the liquid constituents is effected. The latter are released from pressure and while making use of their sensible heat, the constituents of low and middle boiling point range are distilled off from the asphaltic pitch residue. Also higher boiling distillable portions may be separated from the asphaltic constituents by distillation. The aforesaid vapors are cooled by indirect heat exchange with fresh initial material and subsequently in a cooler, and then gaseous constituents are separated from the condensed liquid constituents. The liquid constituents obtained after cooling are fractionated together with the portions distilled off from the constituents withdrawn in the liquid state from the hot separator. By one passage, 24 per cent of gasoline, calculated with reference to the initial material, is obtained. By returning the constituents freed from asphalt boiling above the gasoline range to the reaction chamber, a yield of 70 per cent of gasoline, calculated on the fresh oil, is obtained in all.

Example 2

The constituents of low boiling point of the nature of gasoline and light gas oil are separated from a cracking product of petroleum. From the asphalt-containing residue, an oil having a specific gravity of 0.950, and aniline point of 43° and a content of 18 per cent of constituents boiling up to 325° C. is distilled off. This oil is preheated to 500° C. in a spiral coil together with hydrogen under a pressure of 200 atmospheres and then passed into the reaction chamber after adding to it 1 per cent catalyst. The catalyst consists of lignite coke impregnated with 2 per cent of molybdic acid. The amount of hydrogen is so regulated that there are 20 liters thereof for each kilogram of normally liquid reaction product. The reaction product is cooled and released from pressure, then separated from the catalyst and thereupon distilled. In this manner 35 per cent of gasoline, 62 per cent of gas oil and heavy oil and 3 per cent of asphaltic polymerization products are obtained. The gasoline is an excellent motor fuel, whereas the gas oil and heavy oil are returned to the reaction chamber together with fresh oil and fresh catalyst and converted into gasoline.

What we claim is:—

A process for cracking a heavy hydrocarbon oil into lower hydrocarbon products, which comprises continuously passing a hydrocarbon oil which boils predominantly above 325° C. and which is capable of being cracked into low boiling hydrocarbons together with a small amount of a suspended finely divided sulfur-immune splitting and hydrogenating catalyst and an amount of added hydrogen, sufficient to prevent excessive coking and polymerization, but so regulated that less than 100 liters of hydrogen for each kilogram of normally liquid product leaves the reaction chamber, completely thru a reaction zone maintained under a temperature and pressure suitable for cracking in the liquid phase, continuously discharging the entire reaction mixture together with the suspended catalyst while still under reaction pressure from the reaction zone into a separating zone, continuously withdrawing vaporous products from said zone and separately withdrawing liquid products containing suspended catalysts from said zone, releasing the pressure on said liquid products whereby due to the sensible heat contained in said products lower boiling oils, including gas oil, are removed as vapors therefrom, combining said vapors with products withdrawn in vaporous form from the separating zone, subjecting the mixture to a fractionating operation, recovering a gas oil from said fractionating operation and returning said gas oil to the reaction zone as part of the charging stock containing fresh catalyst.

MATHIAS PIER.
ERNST DONATH.